United States Patent
Kawato et al.

(10) Patent No.: US 7,009,001 B2
(45) Date of Patent: Mar. 7, 2006

(54) AROMATIC POLYCARBONATE RESIN COMPOSITION AND MOLDINGS

(75) Inventors: Hiroshi Kawato, Chiba (JP); Shigeki Kuze, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 290 days.

(21) Appl. No.: 10/344,556

(22) PCT Filed: Aug. 9, 2001

(86) PCT No.: PCT/JP01/06866

§ 371 (c)(1),
(2), (4) Date: Feb. 19, 2003

(87) PCT Pub. No.: WO02/16498

PCT Pub. Date: Feb. 28, 2002

(65) Prior Publication Data

US 2003/0173546 A1    Sep. 18, 2003

(30) Foreign Application Priority Data

Aug. 18, 2000 (JP) .............................. 2000-248413

(51) Int. Cl.
*C08L 69/00* (2006.01)

(52) U.S. Cl. ...................... 525/146; 524/128; 524/381; 524/387; 525/148; 525/468

(58) Field of Classification Search ................ 525/146, 525/148, 468
See application file for complete search history.

(56) References Cited

U.S. PATENT DOCUMENTS

| | | | | |
|---|---|---|---|---|
| 4,743,654 A | * | 5/1988 | Kyu et al. ................... | 525/148 |
| 4,745,029 A | * | 5/1988 | Kambour ..................... | 428/412 |
| 4,906,696 A | * | 3/1990 | Fischer et al. .............. | 525/148 |
| 5,338,798 A | * | 8/1994 | Drzewinski ............... | 525/92 E |
| 6,103,827 A | * | 8/2000 | Saito et al. .................. | 525/148 |

FOREIGN PATENT DOCUMENTS

| | | | | |
|---|---|---|---|---|
| JP | 54106563 A | * | 8/1979 | |
| JP | 63090556 A | * | 4/1988 | |
| JP | 05027101 A | * | 2/1993 | |
| JP | 10-73725 | | 3/1998 | |

\* cited by examiner

*Primary Examiner*—Marc S. Zimmer
(74) *Attorney, Agent, or Firm*—Oblon, Spivak, McClelland, Maier & Neustadt, P.C.

(57) ABSTRACT

Provided is an aromatic polycarbonate resin composition which comprises 100 parts by mass of an aromatic polycarbonate resin and from 0.001 to 1 part by mass of an additional thermoplastic resin that differs from the aromatic polycarbonate resin in the refractive index by at least 0.001 and which is so designed that the ratio (X)/(Y) is at least 0.5 wherein (X) indicates the spectral transmittance at 320 nm through a sample plate of the resin composition having a thickness of 2 mm and (Y) indicates the spectral transmittance at 633 nm through it. Having realized further increase in the transparency of aromatic polycarbonate resin, the resin composition gives moldings of which the transparency is comparable to that of acrylic resin for optical use, and the resin moldings have good impact resistance and heat resistance.

14 Claims, No Drawings

AROMATIC POLYCARBONATE RESIN COMPOSITION AND MOLDINGS

TECHNICAL FIELD

The present invention relates to an aromatic polycarbonate resin composition and moldings. Precisely, it relates to an aromatic polycarbonate resin composition and moldings of good transparency, which are favorable, for example, for optical devices such as optical lenses and optical waveguides, as well as for display panels and illuminator covers, and for substitutes for glass.

BACKGROUND ART

As having the advantages of impact resistance, heat resistance, good electric properties and transparency, aromatic polycarbonate resins are used in various fields. In particular, because of their excellent transparency, they are favorably used for various applications of optical devices such as optical lenses and optical waveguides, and also for optical information-recording media, display panels, illuminator covers, and other substitutes for glass. In some applications thereof, however, the transparency of aromatic polycarbonate resins is often unsatisfactory.

For example, backlight units for liquid-crystal image displays and those for various guide lights generally have a built-in surface light source of a transparent tabular molding that emits light uniformly. The transparent tabular molding receives the light from a main light source, cathode ray tube (fluorescent lamp) combined with it, and emits light from its surface, and this is referred to as an optical waveguide. The material for such an optical waveguide must not attenuate light that passes through it, and is preferably lightweight and well workable.

From these viewpoints, it has heretofore been said that polymethyl methacrylate (PMMA) of thermoplastic resins is the most suitable for optical devices. The overall parallel light transmittance through PMMA is on a high level, falling between 91 and 93%, and the transparency of PMMA is extremely high. In view of its good transparency and workability, therefore, PMMA is an extremely excellent resin for optical devices. However, the heat resistance, the impact resistance and the flame retardancy of PMMA are not always satisfactory. Therefore, the problem with PMMA is that its service conditions are limited for optical waveguides, display panels and illuminator covers.

For example, optical waveguides for backlights for instrument panels, tail lamps and winkers for automobiles must satisfy the requirements of thermal deformation resistance at 120° C. or higher and falling weight impact strength of at least 10J, and for these, PMMA is often impracticable.

In their practical use, aromatic polycarbonate resins have no problem in point of the heat resistance and the impact resistance thereof, but their transparent is far inferior to that of PMMA. Therefore, for optical applications such as optical waveguides, etc., it is desired to increase the level of the transparency of aromatic polycarbonate resins.

Various compositions prepared by blending an aromatic polycarbonate resin and an acrylic resin of higher transparency have been proposed. In general, a resin composition that comprises polycarbonate and polymethyl methacrylate could not be a uniform transparent resin, and it has heretofore been developed as a specific opaque resin having a pearly gloss. After that, some transparent resins have become developed, taking the advantages of the two resins.

For example, <1> JP-B 56-28937 discloses a composition of a polycarbonate and a low-molecular acrylic copolymer that comprises from 75 to 90% by mass of methyl methacrylate and from 10 to 25% by mass of alkyl acrylate. However, in order that the composition could be transparent, the molecular weight of the acrylic copolymer in the composition must be at most 15000, and the acrylic copolymer serves as a plasticizer in the composition. The problem with the composition disclosed is that the physical properties of the polycarbonate resin in the composition are significantly worsened. Though not having any negative influence thereon, the acrylic copolymer in the composition does not improve the transmittance of the composition.

<2> JP-A 63-90551, 63-256647 and 64-1749 say that a copolymer of methyl methacrylate, mono-substituted (meth) acrylamide, maleinimide and (meth)acrylate having a carbon cyclic group is miscible with polycarbonate to give a transparent composition. However, the composition is transparent only when it forms films, but is not transparent when it forms moldings having a thickness of a few mm. Therefore, the composition is not applicable to optical materials and optical waveguides.

To solve the problem, <3> JP-A 4-359953 and 4-359954 disclose an improved composition of an aromatic polycarbonate and a methacrylate copolymer, in which the methacrylate copolymer has at least 50% by mass of phenyl methacrylate units. However, as is obvious from Examples and Comparative Examples given in these, the haze (%), one index of transparency, of 2-mm sheets of the composition that contains 3% by mass of methacrylate copolymer is from 5 to 8%, while, on the other hand, the haze (%) of the same sheets of polycarbonate alone is 4%. This means that the transparency of polycarbonate resin is rather lowered when methacrylate copolymer is added thereto.

As in these, essential improvement of transparency of polycarbonate resin is in fact difficult even if polycarbonate resin which is transparent by itself is combined with acrylic resin having higher transparency.

<4> JP-A 10-73725 and 10-158364 disclose a polycarbonate resin composition of good light transmittance, which comprises 100 parts by mass of polycarbonate resin and from 0.001 to 1 part by mass of acrylic resin and in which the molecular weight of the acrylic resin preferably falls between 200 and 100,000. The composition disclosed differs from the other conventional compositions in point of the technical idea in that the amount of the acrylic resin to be added to polycarbonate resin is at most 1 part by mass, and, in addition, the photoconductivity of the composition is good. Concretely, even when 0.2 parts by mass of acrylic resin is added to 100 parts by mass of polycarbonate resin, the photoconductivity of the resulting composition is comparable to that of acrylic resin alone. In addition, the other advantages of the composition are that the composition has high impact resistance and good heat resistance intrinsic to polycarbonate resin.

However, in the field of optical devices, further improvement of the transparency of polycarbonate resin is much more desired. The composition <4> almost satisfies the transparency and the photoconductivity of acrylic resin of an ordinary grade and is comparable to such an ordinary-grade acrylic resin, but is still inferior to high-transparency acrylic resin for optical use.

Given the current situation as above, the present invention is to further improve the transparency of aromatic polycarbonate resins, and its object is to provide an aromatic polycarbonate resin composition that gives moldings comparable to those of acrylic resins for optical use in point of the transparency not losing the characteristics of good impact resistance and heat resistance intrinsic to aromatic polycarbonate resins, and to provide the moldings of the resin composition.

DISCLOSURE OF THE INVENTION

We, the present inventors have assiduously studied the relationship between the transparency and the spectral transmittance of aromatic polycarbonate resins. As a result, we have found that, when a small amount of any other specific thermoplastic resin is added to an aromatic polycarbonate resin and when the dispersive condition of the resulting resin composition is specifically controlled, then the spectral transmittance of the aromatic polycarbonate resin composition, or that is, the light absorption pattern thereof varies, and this significantly contributes toward the improvement of the transparency of the resin composition. On the basis of these findings, we have completed the present invention.

Specifically, the invention provides the following:

(1) An aromatic polycarbonate resin composition which comprises 100 parts by mass of an aromatic polycarbonate resin and from 0.001 to 1 part by mass of an additional thermoplastic resin that differs from the aromatic polycarbonate resin in the refractive index by at least 0.001 and which is so designed that the ratio (X)/(Y) is at least 0.5 wherein (X) indicates the spectral transmittance at 320 nm through a sample plate of the resin composition having a thickness of 2 mm and (Y) indicates the spectral transmittance at 633 nm through it.

(2) The aromatic polycarbonate resin composition of (1), wherein the additional thermoplastic resin is an acrylic resin.

(3) The aromatic polycarbonate resin composition of (1) or (2), which contains from 0.005 to 0.2 parts by mass of a phosphorus-based antioxidant relative to 100 parts by mass of the aromatic polycarbonate resin.

(4) The aromatic polycarbonate resin composition of (3), wherein the phosphorus-based antioxidant is a pentaerythritol compound.

(5) The aromatic polycarbonate resin composition of (4), wherein the phosphorus-based antioxidant is bis(2,6-di-t-butyl-4-methylphenyl)pentaerythritol phosphite.

(6) The aromatic polycarbonate resin composition of any of (1) to (5), which contains from 0.01 to 2 parts by mass of a functional group-containing silicone compound and/or an alicyclic epoxy compound relative to 100 parts by mass of the aromatic polycarbonate resin.

(7) A transparent molding of the aromatic polycarbonate resin composition of any of (1) to (6).

(8) An optical waveguide made of the aromatic polycarbonate resin composition of any of (1) to (6).

BEST MODES OF CARRYING OUT THE INVENTION

The invention is described in detail hereinunder.

The invention provides an aromatic polycarbonate resin composition which comprises 100 parts by mass of an aromatic polycarbonate resin and from 0.001 to 1 part by mass of an additional thermoplastic resin that differs from the aromatic polycarbonate resin in the refractive index by at least 0.001 and which is so designed that the ratio (X)/(Y) is at least 0.5 wherein (X) indicates the spectral transmittance at 320 nm through a sample plate of the resin composition having a thickness of 2 mm and (Y) indicates the spectral transmittance at 633 nm through it.

It is known that the optical properties such as the overall parallel light transmittance, the haze and the spectral transmittance of aromatic polycarbonate resin significantly depend on the thickness of the test plate of the resin. It is also known that the spectral transmittance of the resin greatly varies at a wavelength falling between 290 nm and 400 nm (when the thickness of the test plate of the resin falls between 0.1 and 5 mm). The optical properties of the aromatic polycarbonate resin result from the molecular structure of the resin, and it has heretofore been considered impossible to improve the optical properties of the resin.

Contrary to this, our studies have revealed that aromatic polycarbonate resin compositions having improved spectral transmittance characteristics can be obtained. This our finding is novel. The improved aromatic polycarbonate resin composition is obtained, for example, by adding, to an aromatic polycarbonate resin, a small amount of an additional thermoplastic resin that differs from the aromatic polycarbonate resin in the refractive index and by controlling the condition for dispersing the two resins.

The principal ingredient of the aromatic polycarbonate resin composition of the invention is an aromatic polycarbonate resin, and this maybe any and everyone not specifically defined. For example, the resin may be produced through reaction of a diphenol and a carbonate precursor. Concretely, a diphenol and a carbonate precursor may be reacted in solution or in melt; more concretely, a diphenol may be reacted with phosgene, or a diphenol may be reacted with a diphenyl carbonate through transesterification.

Various diphenols may be used, including, for example, 2,2-bis(4-hydroxyphenyl)propane [bisphenol A], bis(4-hydroxyphenyl)methane, 1,1-bis(4-hydroxyphenyl)ethane, 2,2-bis(4-hydoxy-3,5-dimethylphenyl)propane, 4,4'-dihydroxydiphenyl, bis(4-hydroxyhenyl)cycloalkane, bis(4-hydroxyphenyl)oxide, bis(4-hydroxyphenyl)sulfide, bis(4-hydroxyphenyl)sulfone, bis (4-hydroxyphenyl)sulfoxide, bis (4-hydroxyphenyl)ether, and bis (4-hydroxyphenyl)ketone.

Especially preferred diphenols are bis(hydroxyphenyl) alkanes, especially those starting from bisphenol A. The carbonate precursor includes carbonyl halides, carbonyl esters and haloformates, concretely, for example, phosgene, diphenol dihaloformates, diphenyl carbonate, dimethyl carbonate, and diethyl carbonate.

The aromatic polycarbonate resin may have a branched structure, for which the branching agent may be any of 1,1,1-tris(4-hydroxyphenyl)ethane, α,α',α"-tris(4-hydroxyphenyl)-1,3,5-triisopropylbenzene, phloroglucine, trimellitic acid, and isatin-bis(o-cresol). For controlling the molecular weight of the resin, usable is any of phenol, p-t-butylphenol, p-t-octylphenol, p-cumylphenol, and p-dodecylphenol.

The viscosity-average molecular weight of the aromatic polycarbonate resin for use in the invention generally falls between 10,000 and 100,000, but preferably between 11,000 and 40,000, more preferably between 12,000 and 30,000. The viscosity-average molecular weight (Mv) of the resin is obtained as follows: The viscosity of the resin in methylene chloride at 20° C. is measured with an Ubbelohde's viscometer, from which is derived the intrinsic viscosity [η] thereof. The viscosity-average molecular weight (Mv) of the resin is calculated according to the following formula:

$$[\eta]=1.23\times10^{-5}M_v^{0.83}$$

The aromatic polycarbonate resin composition of the invention has the spectral transmittance characteristic mentioned above. The aromatic polycarbonate resin composition that has the spectral transmittance characteristic as above is obtained concretely by mixing 100 parts by mass of an aromatic polycarbonate resin and from 0.001 to 1 part by mass of an additional thermoplastic resin that differs from the aromatic polycarbonate resin in the refractive index by at least 0.001 (the refractive index of bisphenol A polycarbonate resin is 1.590), for which the dispersive condition the additional thermoplastic resin in the composition is specifically controlled. In order that the resulting aromatic polycarbonate resin composition may satisfy the spectral transmittance characteristic as above, it is a matter of importance that the small amount of the additional thermoplastic resin added to the resin composition is finely dispersed in the moldings of the resin composition.

The additional thermoplastic that differs from the aromatic polycarbonate resin in the diffractive index by at least 0.001, preferably by 0.01 to 0.2 is not specifically defined, but is preferably an acrylic resin. The acrylic resin is a resin that comprises repetitive monomer units of, for example, from acrylic acid, acrylates, acrylonitrile and their derivatives, and it may be either a homopolymer or a copolymer with styrene, butadiene or the like.

Concretely, it includes, for example, polyacrylic acid, polymethyl methacrylate (PMMA), polyacrylonitrile, polyethyl acrylate, polyacrylic acid-2-chloroethyl copolymer, acrylic acid-n-butyl-acrylonitrile copolymer, acrylonitrile-styrene copolymer, acrylonitrile-butadiene copolymer, and acrylonitrile-butadiene-styrene copolymer. Of those, especially preferred is polymethyl methacrylate (PMMA). In addition, the molecular weight of the acrylic resin preferably falls between 200 and 100,000, more preferably between 10,000 and 60,000 or so.

The aromatic polycarbonate resin composition of the invention comprises, for example, 100 parts by mass of such an aromatic polycarbonate resin, and from 0.001 to 1 part by mass, preferably from 0.05 to 0.5 parts by mass, more preferably from 0.1 to 0.3 parts by mass of such an acrylic resin.

The aromatic polycarbonate resin composition of the invention may be obtained, for example, by melting, kneading and shaping a shaping material that comprises 100 parts by mass of an aromatic polycarbonate resin (e.g., bisphenol A polycarbonate resin) and from 0.001 to 1 part by mass of an acrylic resin such as polymethyl methacrylate (PMMA).

The shaping material to be shaped in melt is not specifically defined, and, for example, it may be a dry blend of pellets, powders or flakes of aromatic polycarbonate resin and acrylic resin; or a dry blend of a master batch from a melt blend of aromatic polycarbonate resin and acrylic resin of relatively high concentration, with an additional aromatic polycarbonate resin added thereto. If desired, aromatic polycarbonate resin and acrylic resin may be blended in solution that contains a solvent of methylene chloride or ethylene chloride. In this case, acrylic resin of high concentration may be blended with aromatic polycarbonate in solution to prepare a master batch of aromatic polycarbonate resin with acrylic resin well dispersed therein, and the resulting master batch may be kneaded in melt with additional aromatic polycarbonate resin and then pelletized to give ordinary resin pellets for shaping material.

Though the reason is not as yet completely clarified, the aromatic polycarbonate resin composition of the invention may realize the intended specific spectral transmittance characteristic when acrylic resin is dispersed in the resin composition (or moldings) in a specific condition, concretely, when the acrylic resin particles dispersed in the resin composition (or moldings) are so controlled that they are not microscopically definitely separated from each other.

For example, for the melt-kneading condition to give the resin composition, acrylic resin must be fully dispersed in melt in aromatic polycarbonate resin in the resulting resin composition, for which, therefore, the two resins must be kneaded at a relatively high shear force. The melt viscosity of aromatic polycarbonate resin is relatively high, and when the resin is kneaded in melt with acrylic resin, the shear condition for enhancing the dispersibility of the acrylic resin in the resin composition will often cause thermal deterioration and discoloration of aromatic polycarbonate resin and even reduction in the spectral transmittance of the resulting resin composition. Therefore, taking these negative influences on the resin composition into consideration, it is a matter of great importance to suitably select good melt kneaders and good melt conditions favorable for the resin composition of the invention.

Not detracting from the specific spectral transmittance characteristic thereof, the aromatic polycarbonate resin composition of the invention may contain various additives. For antioxidant to the composition, for example, preferred are phosphorus-based antioxidants such as phosphites and phosphates. The phosphites may be tri-, di and monophosphites, including, for example, triphenyl phosphite, trisnonylphenyl phosphite, tris(2,4-di-tert-butylphenyl)phosphite, trinonyl phosphite, tridecyl phosphite, trioctyl phosphite, trioctadecyl phosphite, distearylpentaerythritol diphosphite, tricyclohexyl phosphite, monobutyldiphenyl phosphite, monooctyldiphenyl phosphite, distearylpentaerythritol diphosphite, bis(2,4-di-tert-butylphenyl)pentaerythritol phosphite, bis(2,6-di-tert-butyl-4-methylphenyl)pentaerythritol phosphite, 2,2-methylenebis(4,6-di-tert-butylphenyl)octyl phosphite, and tetrakis(2,4-di-tert-butylphenyl)-4,4-diphenylene phosphonite.

The phosphates include, for example, trimethyl phosphate, triethyl phosphate, tributyl phosphate, trioctyl phosphate, triphenyl phosphate, tricresyl phosphate, tris(nonylphenyl) phosphate, and 2-ethylphenyldiphenyl phosphate. One or more of these phosphorus-based antioxidants may be in the resin composition either singly or as combined.

Of those phosphorus-based antioxidants, especially preferred are distearylpentaerythritol diphosphite, bis(2,4-di-ter-butylphenyl)pentaerythritol phosphite, bis(2,6-di-tert-butyl-4-methylphenyl)pentaerythritol phosphite, tris(2,4-di-tert-butylphenyl)phosphite. More preferred are pentaerythritol phosphites; and even more preferred is bis (2,6-di-tert-butyl-4-methylphenyl)pentaerythritol phosphite.

The phosphorus-based antioxidant content of the resin composition may fall between 0.005 and 0.2 parts by mass, preferably between 0.01 and 0.1 parts by mass, per 100 parts by mass of the aromatic polycarbonate resin in the composition. In addition, the aromatic polycarbonate resin for use in the invention may contain a functional group-containing silicone compound and an alicyclic epoxy compound. The functional group-containing silicone compound may be a functional group-having (poly)organosiloxane, and its skeleton is a polymer or a copolymer having a basic structure of a formula:

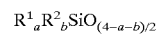

wherein $R^1$ represents a functional group-containing group; $R^2$ represents a hydrocarbon group having from 1 to 12 carbon atoms; and a and b satisfy the following: $0<a\leq3$, $0\leq b<3$, $0<a+b\leq3$. The functional group includes, for example, an alkoxy group, an aryloxy group, a polyoxyalkylene group, a hydrogen atom, a hydroxyl group, a carboxyl group, a cyanol group, an amino group, a mercapto group, and an epoxy group.

Regarding the functional group therein, the silicone compound having multiple functional groups, or silicone compounds each having a different functional group may be combined for use herein. In the functional group-having silicone compound as above, the ratio of functional group ($R^1$)/hydrocarbon group ($R^2$) generally falls between 0.1 and 3, preferably between 0.3 and 2 or so.

The silicone compound may be liquid or powdery, but is preferably well dispersible in the resin composition while the composition is kneaded in melt. For example, one preferred example of the silicone compound is liquid at room temperature, having a kinematic viscosity at room temperature of from 10 to 500,000 mm²/sec. Even though the silicone compound is liquid, it can be uniformly dispersed in the moldings of the resin composition, and it rarely bleeds out of the surfaces of the moldings while and after the moldings are formed. This is one characteristic advantage of the invention.

The amount of the functional group-containing silicone compound that may be added to the aromatic polycarbonate resin falls between 0.01 and 2.0 parts by mass, but preferably between 0.05 and 1.0 part by mass, per 100 parts by mass of the resin. If its amount is smaller than 0.01 parts by mass, the silicone compound will be ineffective for improving the thermal stability and the optical properties of the resin composition; but if larger than 2.0 parts by mass, it may worsen the optical properties of the resin composition.

The alicyclic epoxy compound is a cycloaliphatic compound having an alicyclic epoxy group, or that is, having an epoxy group with one oxygen atom added to the ethylene bond in the alicyclic ring. Concretely, the alicyclic epoxy compound includes, for example, 1,2-epoxycyclohexane, 1,4-epoxyccylohexane, 1-methyl-1,2-epoxycyclohexane, 1,3-dimethyl-1,2-epoxycyclohexane, 1-methoxy-1,2-epoxycyclohexane, 1,4-epoxy-2-cyclohexane, and compounds of the following formulae (1) to (5), wherein R represents H or $CH_3$ and a+b=1 or 2:

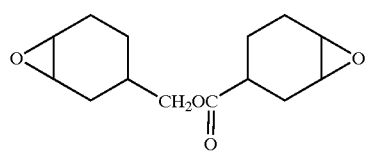
(1)

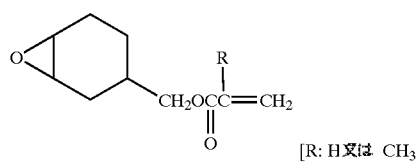
[R: H 또는 $CH_3$]
(2)

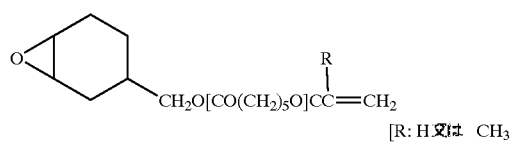
[R: H 또는 $CH_3$]
(3)

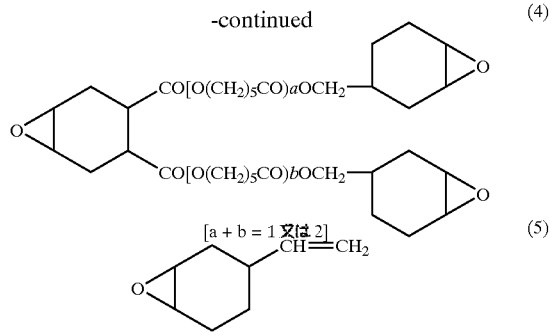
[a + b = 1 또는 2]
(4)
(5)

The amount of the alicyclic epoxy compound that may be in the resin composition may fall between 0.01 and 1.0 part by mass, but preferably between 0.02 and 0.5 parts by mass per 100 parts by mass of the aromatic polycarbonate resin in the composition. If it is smaller than 0.01 parts by mass, it will be ineffective for hydrolysis resistance and will also be ineffective for improving the optical properties of the resin composition; but if larger than 1.0 part by mass, it will worsen the optical properties of the resin composition.

In addition to the components mentioned hereinabove, the aromatic polycarbonate resin composition of the invention may further contain any other various additives not specifically detracting from the effect of the invention if necessary. For example, the resin composition may contain any of hindered phenols or amines for antioxidants; benzotriazoles or benzophenones for UV absorbents; hindered amines for light stabilizers; aliphatic carboxylates, paraffins, silicone oils or polyethylene waxes for internal lubricants, antistatic agents, colorants, mold releasing agents, flame retardants, etc.

One example of producing the aromatic polycarbonate resin composition and its moldings is described below. The aromatic polycarbonate resin composition of the invention may be produced, for example, by dry blending a molding material of aromatic polycarbonate resin and PMMA in a ribbon blender, a drum tumbler, a Henschel mixer or the like, followed by pelletizing the resulting blend through a single-screw extruder, a double-screw extruder, a multi-screw extruder or the like into ordinary resin pellets. Thus formed, the resin pellets are molded into various moldings. Regarding the condition for melt-kneading the blend in pelletizing it, the cylinder temperature suitably falls between 230 and 280° C. If the temperature is lower than 230° C., it is unfavorable since the acrylic resin could not well disperse in the pellets owing to melt failure and since the resin will yellow owing to high shear stress; but if higher than 280° C., it is also unfavorable since the resin will also yellow at such high temperatures. For good dispersion of acrylic resin in the resin composition, the shear force to be applied to the constituent components being blended must be at least on a certain level or higher, and the compression ratio, the screw design, the screw diameter and the screw revolution of the extruder used for pelletization, and also the molding temperature at which the resin pellets are molded must be suitably determined.

Next, the pellets are generally molded into moldings in a mode of, for example, injection molding or extrusion molding, especially preferably through injection molding. In the process of injection molding to give the intended resin moldings, the cylinder temperature is generally set to fall between 260 and 320° C. The temperature is suitably determined, depending on the thickness and the size of the moldings to be produced, or that is, depending on the melt flow length of the resin composition being molded. Preferably, the mold temperature falls between 50 and 120° C. If it is lower than 50° C., the mold transferability will be poor; but if higher than 120° C., the resin phase separation of aromatic polycarbonate resin/PMMA will be serious and the transparency of the resulting resin moldings will lower. Anyhow, higher or lower temperatures than the defined range are unfavorable.

The transparent moldings of the invention are not specifically defined, and they may be suitably designed in accordance with their final applications. For example, they may be shaped in any desired manner, including, for example, flat plates, curved plates, notches, cups, boxes, etc. The aromatic polycarbonate resin composition and its moldings of the invention are so designed that the ratio (X)/(Y) is at least 0.5, preferably at least 0.55, wherein (X) indicates the spectral transmittance at 320 nm through a sample plate of the resin composition having a thickness of 2 mm and (Y) indicates the spectral transmittance at 633 nm through it. For forming the sample plate of the resin composition having a thickness of 2 mm, the resin composition may be injection-molded into the intended sample plate in the manner as above. The molding temperature may be selected from the range of from 260 to 320° C. in accordance with the molecular weight of the aromatic polycarbonate resin in the resin composition, and the mold temperature may fall between 60 and 110° C. or so.

The aromatic polycarbonate resin composition of the invention realizes increased light transmittance, not lowering the impact resistance and the heat resistance intrinsic to the aromatic polycarbonate resin in the composition.

The aromatic polycarbonate resin composition of the invention significantly differs from any other conventional aromatic polycarbonate resin compositions in point of the spectral transmittance, and it has a complete light transmittance comparable to that of PMMA. Accordingly, the aromatic polycarbonate resin composition of the invention is usable, for example, for optical devices such as optical lenses and optical waveguides, and for various illuminator covers and display panels as substitutes for glass.

The invention is described more concretely with reference to the following Examples and Comparative Examples, which, however, are not intended to restrict the scope of the invention.

EXAMPLES 1 TO 3, AND COMPARATIVE EXAMPLES 1 AND 2

As in Table 1, the components were formulated (parts by mass) in the ratio indicated, then kneaded in melt and pelletized through a screw extruder. The resulting pellets were dried at 120° C. for 12 hours, and then injection-molded into sample plates (140 mm×140 mm×2 mm thickness) for spectral transmittance determination, sample plates (70 mm×70 mm×3 mm thickness) for complete light transmittance determination, and other test pieces for determination of physical properties. The molding resin temperature was 300° C.; and the mold temperature was 100° C. Thus formed, the sample plates and the test pieces were tested for the optical properties, the heat resistance and the impact resistance. The test data obtained are given in Table 1.

The molding materials used herein, the condition for pelletization, and the methods for evaluating the samples are mentioned below.

1. Molding Materials:

(A) Aromatic Polycarbonate Resin:
Toughlon FN1700A (by Idemitsu Petrochemical—this is a bisphenol A polycarbonate resin having a viscosity-average molecular weight of 18,000 and a refractive index of 1.590.

(B) Polymethyl Methacrylate (PMMA):
Dianal BR87 (by Mitsubishi Rayon), having a molecular weight of 25,000 and a refractive index of 1.490.

Its molecular weight was measured as follows: Using an Ostwald viscometer, the intrinsic viscosity [η] of the polymer in chloroform at 25° C. was measured, and the mean degree of polymerization PA of the polymer was derived from the thus-measured intrinsic viscosity [η] according to the following equation:

$$\log PA = 1.613 \log([\eta] \times 10^4 / 8.29)$$

(C) Phosphorus-Based Antioxidant:
Irgafos 168 (by Ciba Speciality Chemicals)—this is tris (2,4-di-t-butylphenyl)phosphite.
Adekastab PEP-36 (by Asahi Denka)—this is bis(2,6-di-t-butyl-4-methylphenyl)pentaerythritol phosphite.

(D) Functional Group-Containing Silicone Compound:
KR219 (by Shin-etsu Chemical Industry)—this is vinyl and methoxy-having methylphenylsilicone having a kinematic viscosity of 18 $mm^2/sec$.

(E) Alicyclic Epoxy Compound:
Celoxide 2021P (by Daicel Chemical Industry)—this is the compound of formula (1) mentioned above.

2. Condition for Pelletization:

Condition [I]:
70 mmφ single-screw extruder (L/D=36, compression ratio=1.6) is used. The cylinder temperature is 250° C.; and the screw revolution is 100 rpm.

Condition [II]:
40 mmφ single-screw extruder (L/D=28, compression ratio=2.7) is used. The cylinder temperature is 280° C.; and the screw revolution is 100 rpm.

3. Methods for Evaluation of Samples:

(1) Determination of Spectral Transmittance:
Device used: Shimadzu's UV-2400PC
Thickness of sample plate: 2 mm (2) Determination of Complete Light Transmittance:
Using a test device of JIS K7105, the complete light transmittance of the sample plate was measured as follows:

The injection-molded sample plate (70 mm×70 mm×3 mm thickness) to be tested was sandwiched between two injection-molded plates (70 mm×70 mm×3 mm thickness) of Idemitsu Petrochemical's Toughlon HR2500 (high-reflection material), and its complete light transmittance was measured in that condition. The sample set was sealed with the high-reflection material plate so as to protect it from the light leakage through the side exposed to light, to such a degree that the complete light transmittance through a control set of two plates of Toughlon HR2500 with no sample plate therebetween (with a cavity between the two) could be 100%. The. aperture for the incident light was 10 mm×1 mm.

(3) Thermal Deformation Temperature:
Measured according to the method A (1.81 MPa) of JIS K7207.

(4) Falling Weight Impact Strength:
Measured according to ASTM D3763-86.
The weight falling rate is 7 m/sec; and the load to the sample is 36.85 N.

TABLE 1

|  | Example 1 | Example 2 | Example 3 | Comp. Ex. 1 | Comp. Ex. 2 |
|---|---|---|---|---|---|
| Aromatic Polycarbonate | 100 | 100 | 100 | 100 | 100 |
| PMMA | 0.1 | 0.1 | 0.2 | 0 | 0.1 |
| Irgafos 168 | 0.02 | 0 | 0 | 0.02 | 0 |
| PEP-36 | 0 | 0.05 | 0.05 | 0 | 0.05 |
| KP219 | 0.1 | 0.1 | 0.1 | 0 | 0.1 |
| Celoxide 2021P | 0.05 | 0.05 | 0.05 | 0 | 0.05 |
| Condition for Pelletization | (I) | (I) | (I) | (II) | (II) |
| Spectral Transmittance (%) | | | | | |
| (X) 320 nm | 52.6 | 57.5 | 59.3 | 34.7 | 43.2 |
| (Y) 633 nm | 90.8 | 91.0 | 91.2 | 89.0 | 90.0 |
| Ratio of (X)/(Y) | 0.58 | 0.63 | 0.65 | 0.39 | 0.48 |
| Complete Light Transmittance (%) | 93.8 | 94.0 | 94.1 | 70.0 | 92.8 |
| Thermal Deformation Temperature (° C.) | 130 | 130 | 130 | 130 | 130 |
| Falling Weight Impact Strength (J) | 40 | 41 | 40 | 42 | 40 |

INDUSTRIAL APPLICABILITY

Of the moldings of the aromatic polycarbonate resin composition of the invention, the physical properties are not lowered as compared with those of the moldings of aromatic polycarbonate resin alone, and the light transmittance is increased. Concretely, the transparency of the moldings is comparable to the optical grade of PMMA resin, one typical example of high-transparency resins. Accordingly, the resin moldings of the invention are expected to have more increased applications in the field of optical products in which PMMA resin could not be used because of its low heat resistance and impact resistance.

What is claimed is:

1. An aromatic polycarbonate resin composition which comprises 100 parts by mass of an aromatic polycarbonate resin and from 0.001 to 1 part by mass of an additional thermoplastic resin that differs from the aromatic polycarbonate resin in the refractive index by at least 0.001 and which is so designed that the ratio (X)/(Y) is at least 0.5 wherein (X) indicates the spectral transmittance at 320 nm through a sample plate of the resin composition having a thickness of 2 mm and (Y) indicates the spectral transmittance at 633 nm through it.

2. The aromatic polycarbonate resin composition as claimed in claim 1, wherein the additional thermoplastic resin is an acrylic resin.

3. The aromatic polycarbonate resin composition as claimed in claim 1, which contains from 0.005 to 0.2 parts by mass of a phosphorus-based antioxidant relative to 100 parts by mass of the aromatic polycarbonate resin.

4. The aromatic polycarbonate resin composition as claimed in claim 3, wherein the phosphorus-based antioxidant is a compound derived from a phosphorus compound and pentaerythritol.

5. The aromatic polycarbonate resin composition as claimed in claim 4, wherein the phosphorus-based antioxidant is bis(2,6-di-t-butyl-4-methylphenyl)pentaerythritol phosphite.

6. The aromatic polycarbonate resin composition as claimed in claim 1, which contains from 0.01 to 2 parts by mass of a functional group-containing silicone compound and/or an alicyclic epoxy compound relative to 100 parts by mass of the aromatic polycarbonate resin.

7. A transparent molding comprising the aromatic polycarbonate resin composition of claim 1.

8. An optical waveguide comprising the aromatic polycarbonate resin composition of claim 1.

9. The aromatic polycarbonate resin composition as claimed in claim 1, wherein the aromatic polycarbonate resin has a viscosity-average molecular weight between 10,000 and 100,000.

10. The aromatic polycarbonate resin composition as claimed in claim 1, wherein the aromatic polycarbonate resin has a viscosity-average molecular weight between 11,000 and 40,000.

11. The aromatic polycarbonate resin composition as claimed in claim 1, wherein the additional thermoplastic resin differs from the aromatic polycarbonate resin in the refractive index by between 0.01 and 0.2.

12. The aromatic polycarbonate resin composition as claimed in claim 1, wherein the composition comprises from 0.05 to 0.5 parts by mass of an acrylic resin.

13. The aromatic polycarbonate resin compositions as claimed in claim 2, wherein the acrylic resin is polymethyl methacrylate.

14. The aromatic polycarbonate resin composition as claimed in claim 3, which contains from 0.01 to 0.1 parts by mass of a phosphorus-based antioxidant relative to 100 parts by mass of the aromatic polycarbonate resin.

* * * * *